M. A. BENJAMIN.
TREADLE.

No. 180,743.

Patented Aug. 8, 1876.

Attest:
Thomas Bernard
J. Wm. Mister

Inventor:
M. A. Benjamin
Edson Bros.
Attorneys

UNITED STATES PATENT OFFICE.

MANLEY A. BENJAMIN, OF BUFFALO, NEW YORK.

IMPROVEMENT IN TREADLES.

Specification forming part of Letters Patent No. 180,743, dated August 8, 1876; application filed June 19, 1876.

*To all whom it may concern:*

Be it known that I, MANLEY A. BENJAMIN, of Buffalo, in the county of Erie and State of New York, have invented certain new and useful Improvements in Treadles; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 2:
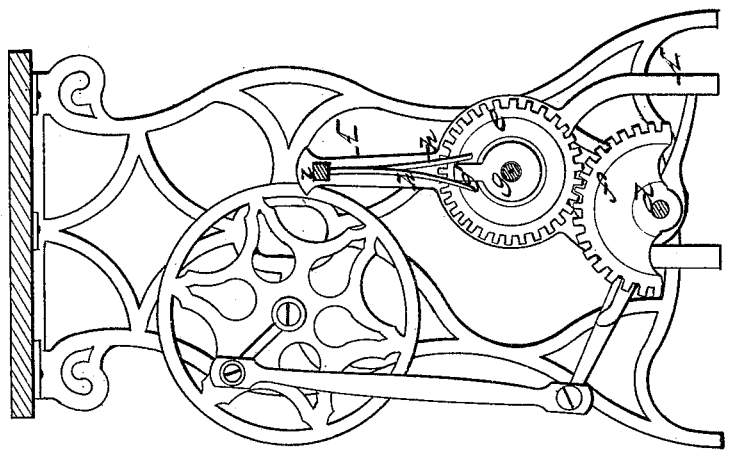
Figure 1:
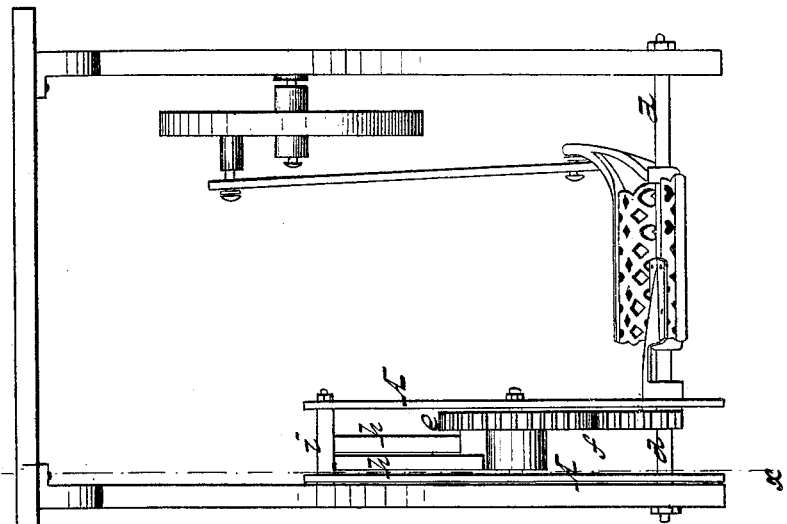

Figure 1 is a front view of my improved treadle, and Fig. 2 is a vertical section thereof, through the dotted line $x$ $x$ of Fig. 1.

Corresponding parts in the two figures are designated by like letters.

This invention relates to a certain improvement in treadles; and consists of mechanism, substantially as hereinafter described, for overcoming the dead-center.

In the annexed drawing, A refers to a frame, adjusted to a sewing-machine table in any known way, and having a cog-wheel, $e$, gearing with a toothed segment or arc, $f$, upon the treadle-axis $a$. Upon the axis of the cog-wheel $e$ is a cam, $g$, having its tooth or projection $g'$ held between the torsional springs $h$ $h$ fastened to and depending from a cross-bar, $i$, of the frame A.

It will be seen that the springs $h$ $h$ are secured, at their fastened ends, in a line edgewise with each other, and twisted to the opposite sides of the tooth or projection $g'$ of the cam $g$, from whence they derive their torsional power, by which, as the foot is removed from the treadle, and the gearing $e$ $f$ ceases its movement, the tooth or projection $g'$ of the cam $g$ will be returned to a state of rest, and caused to occupy a vertical position, as seen in Fig. 2. By thus holding the projection or tooth $g'$, it will be observed that the gearing $e$ $f$ will be stopped, so as to bring the treadle and its pitman to rest out of a dead-center with the axis of the driving or band wheel.

Having thus described my invention, what I claim, and desire to secure by Letters Patent, is—

The torsional springs $h$ $h$, in combination with the cam $g$ $g'$, cog-wheel $e$, and toothed arc or segment $f$, upon the treadle-axis $a$, substantially as and for the purpose set forth.

In testimony that I claim the foregoing as my own, I hereunto affix my signature in presence of two witnesses.

MANLEY A. BENJAMIN.

Witnesses:
   WM. T. PARSONS,
   E. B. BYINGTON.